United States Patent
Gassani

(12) 
(10) Patent No.: US 11,329,353 B2
(45) Date of Patent: May 10, 2022

(54) HIGH EFFICIENCY ELECTROCHEMICAL POWER SUPPLY SOURCE FOR AN UNDERWATER VEHICLE

(71) Applicant: LEONARDO S.p.A., Rome (IT)

(72) Inventor: Yuri Gassani, Leghorn (IT)

(73) Assignee: LEONARDO S.P.A., Rome (IT)

( * ) Notice: Subject to any disclaimer, the term of this patent is extended or adjusted under 35 U.S.C. 154(b) by 291 days.

(21) Appl. No.: 16/818,307

(22) Filed: Mar. 13, 2020

(65) Prior Publication Data

US 2020/0295342 A1    Sep. 17, 2020

(30) Foreign Application Priority Data

Mar. 15, 2019 (IT) .................. 102019000003821

(51) Int. Cl.
| | |
|---|---|
| *H01M 50/70* | (2021.01) |
| *B63G 8/08* | (2006.01) |
| *G05D 11/16* | (2006.01) |
| *G05D 23/13* | (2006.01) |

(52) U.S. Cl.
CPC .............. *H01M 50/70* (2021.01); *B63G 8/08* (2013.01); *G05D 11/16* (2013.01); *G05D 23/1393* (2013.01); *H01M 2220/20* (2013.01)

(58) Field of Classification Search
CPC .... H01M 50/70; H01M 2220/20; B63G 8/08; G05D 11/16; G05D 23/1393
See application file for complete search history.

(56) References Cited

U.S. PATENT DOCUMENTS

| | | | | |
|---|---|---|---|---|
| 3,906,330 A | * | 9/1975 | Salamon ............... | H01M 10/52 320/147 |
| 4,435,487 A | * | 3/1984 | Supelak ................ | D21C 3/003 429/70 |
| 4,710,438 A | * | 12/1987 | Leben ................... | H01M 6/34 429/119 |

(Continued)

FOREIGN PATENT DOCUMENTS

EP       0 476 916       3/1992

OTHER PUBLICATIONS

Dow, Eric G., "The Development of Aluminum Aqueous Batteries for Torpedo Propulsion", Proceedings of 11th Annual Battery Conference on Applications and Advances, Jan. 9-12, 1996.

*Primary Examiner* — Stephen P Avila
(74) *Attorney, Agent, or Firm* — Leason Ellis LLP

(57) ABSTRACT

An electrochemical-type power supply source for use in marine environment, is provided with: an electrochemical stack, which generates electric power in the presence, internally, of an electrolytic fluid; a first tank, designed to contain electrolytic fluid at a first temperature; a second tank, designed to contain electrolytic fluid at a second temperature, lower than the first temperature; a thermostatic valve, that mixes electrolytic fluid at a lower temperature with electrolytic fluid at a higher temperature, for generating a mixed electrolytic fluid to be introduced into the electrochemical stack at a controlled temperature for generating a desired electric power. The electrochemical power supply is further provided with an auxiliary tank, adapted to contain electrolytic fluid at a third temperature, higher than the first temperature; and the thermostatic valve is connected to the auxiliary tank and receives, at an input, the electrolytic fluid at the third temperature.

15 Claims, 3 Drawing Sheets

(56) References Cited

U.S. PATENT DOCUMENTS

| | | | |
|---|---|---|---|
| 4,752,542 A | | 6/1988 | Leben et al. |
| 5,543,243 A | * | 8/1996 | Brecht .................. H01M 50/70 |
| | | | 429/81 |
| 9,450,227 B2 | | 9/2016 | Subacquei et al. |
| 2007/0111043 A1 | | 5/2007 | Stocchiero |

* cited by examiner

HIGH EFFICIENCY ELECTROCHEMICAL POWER SUPPLY SOURCE FOR AN UNDERWATER VEHICLE

CROSS-REFERENCE TO RELATED APPLICATIONS

This Patent Application claims priority from Italian Patent Application No. 102019000003821 filed on Mar. 15, 2019, the entire disclosure of which is incorporated herein by reference.

TECHNICAL FIELD

The present invention relates to a high efficiency electrochemical power supply source, for use in a marine environment in an underwater vehicle, for example a torpedo.

BACKGROUND ART

Electrochemical-type power supply sources (so called electrochemical "stacks" or "batteries"), for example of the aluminium-silver oxide (Al—AgO) type, are used in underwater vehicles for the propulsion and/or for supplying electric power to on board electrical systems. As known, an electrochemical-type power supply source comprises an electrochemical stack, consisting of cells containing at least two electrodes (anode and cathode), typically made of metal materials with different electronegative potential, wherein an appropriate electrolytic fluid is circulated.

Such electrolytic fluid undergoes a rise in temperature when it is inside the electrochemical stack, due to exothermic chemical reactions occurring inside the electrochemical stack for producing electric power.

The electrolytic fluid is then generally extracted from the electrochemical stack and cooled by means of appropriate cooling systems, to avoid a system thermal drift, to be later re-introduced into the electrochemical stack.

The temperature control of the electrolytic fluid introduced into the electrochemical stack represents an important parameter for the correct operation of the power supply source, being related to the electric power generated; in particular, it is known to adjust the electrolytic fluid temperature in order to generate a variable power depending on the needs of the underwater vehicle.

In order to implement an electrolytic fluid temperature adjustment, the use of an adjustment system has been proposed, which comprises a heat exchanger, two tanks designed to contain electrolytic fluid at a different temperature and a thermostatic valve with two mixing inlets.

In particular, a first tank contains electrolytic fluid at a higher temperature, defined as "hot", which is withdrawn from the electrochemical stack; a second tank contains instead electrolytic fluid at a lower temperature (defined as "cold"), obtained by means of appropriately cooling of the hot electrolytic fluid, which is flown through the heat exchanger.

The thermostatic valve has a first and a second mixing inlets, connected respectively to the first and second tanks, a fluid outlet connected to an inlet of the electrochemical stack, and adjustment means actuatable to control mixing of the hot electrolytic fluid and cold electrolytic fluid, so as to adjust the temperature of the mixed electrolytic fluid to be supplied to the electrochemical stack.

As previously indicated, such temperature adjustment allows to optimize the energy yield of the electrochemical power supply for the various operating regimes.

In particular, in the Al—AgO technology-based power supply sources, a low temperature is employed for low power (and low speeds) and a high temperature for high power (and high speeds). The drop in the electrolytic fluid temperature at low power allows to reduce internal losses (in particular, reducing energy absorption due to the so-called leakage currents) and therefore to preserve the stored energy for the vehicle actual "mission".

The possibility of reducing the temperature is however limited, in current applications, by the fact that in a transition mode, in case of a sudden request of high power (for example to allow performing a final manoeuvre of approaching a target, in case of a torpedo), the power supply source has to be able to supply the required power even from the low temperature levels at which the electrolytic fluid is, and this is possible only if the starting temperature is not too low.

By further reducing the temperature it would be possible to obtain an improvement of yield at low power, but in case high electric power is required, without waiting for the electrolytic fluid to heat, an excessive voltage drop would occur well beyond the vehicle acceptable limitations, with a possible switching off and termination of the mission.

In order to solve such problem, use of a secondary tank has been proposed, to complement the aforesaid first tank containing the hot electrolytic fluid, having a great size and where high temperature electrolytic liquid is generated, that is to be mixed with the hot electrolytic fluid contained in the first tank in order to increase the temperature thereof in case it is required to rapidly generate electric power.

Such a type of solution is for example disclosed in EP 0 476 916 A1, or in "The Development of Aluminum Aqueous Batteries for Torpedo Propulsion", Proceedings of 11th Annual Battery Conference on Applications and Advances, 9-12 Jan. 1996.

Such solution however requires considerable space, due to the additional presence of the aforesaid secondary tank, having great size, and may not be applicable to underwater vehicles, for example torpedoes, wherein size containment represents an important project requirement. Furthermore, such solution requires in any case a non-negligible time for heating the electrolytic fluid in the first tank, due to the mixing with the electrolytic fluid contained in the auxiliary tank.

DISCLOSURE OF INVENTION

The object of the present invention is to provide a solution which allows to solve the previously highlighted problems and which allows in particular to improve the efficiency of an electrochemical power supply source and, consequently, the use range (in terms of launch duration and/or distance) of the associated underwater vehicle, with no need to require at a same time an increase in the power supply source size.

According to the present invention an electrochemical power supply source is provided, as described in the appended claims.

BRIEF DESCRIPTION OF THE DRAWINGS

To better understand the present invention preferred embodiments thereof will now be described, for exemplary and non-limiting purposes, with reference to the appended claims, wherein:

BEST MODE FOR CARRYING OUT THE INVENTION

As will be described in detail hereafter, an aspect of the present solution envisages introducing an electrolytic fluid reserve (so called "super-hot", namely at a very high temperature), contained in a specific auxiliary tank, having small size, which enables to increase the input temperature to the electrolytic stack in a short time (for example in the order of few seconds) thus enabling the electrochemical power supply to immediately activate a high-power condition making it possible for the corresponding underwater vehicle to perform manoeuvres with relevant speeds even starting from very low electrolytic fluid temperatures.

In particular, an aspect of the present invention provides a direct connection of the aforesaid auxiliary tank with a mixing inlet of the thermostatic valve, which thus manages in a controlled way the direct injection of high-temperature electrolytic fluid into the electrochemical stack, during the transitory acceleration phase (with high power requirement).

Such direct injection into the thermostatic valve (instead of mixing the "super-hot" electrolytic fluid of the auxiliary tank with the electrolytic fluid of the hot tank, as in known solutions, see the previous discussion), allows to very quickly activate the high-power mode and to exploit the high power generated by the electrochemical process to rapidly heat the electrolytic mass (all this by using an auxiliary tank size which is smaller than that of the known solutions).

The present solution thus allows to preserve the acceleration range of the underwater vehicle even when the power supply source operates at lower temperatures; in other words, the electrolytic power supply source can operate within low temperature ranges (and therefore with high yields) that could not be obtained until today in case of low power, without jeopardising the "leap" to high power and maximum speed accelerations.

Figure 1:
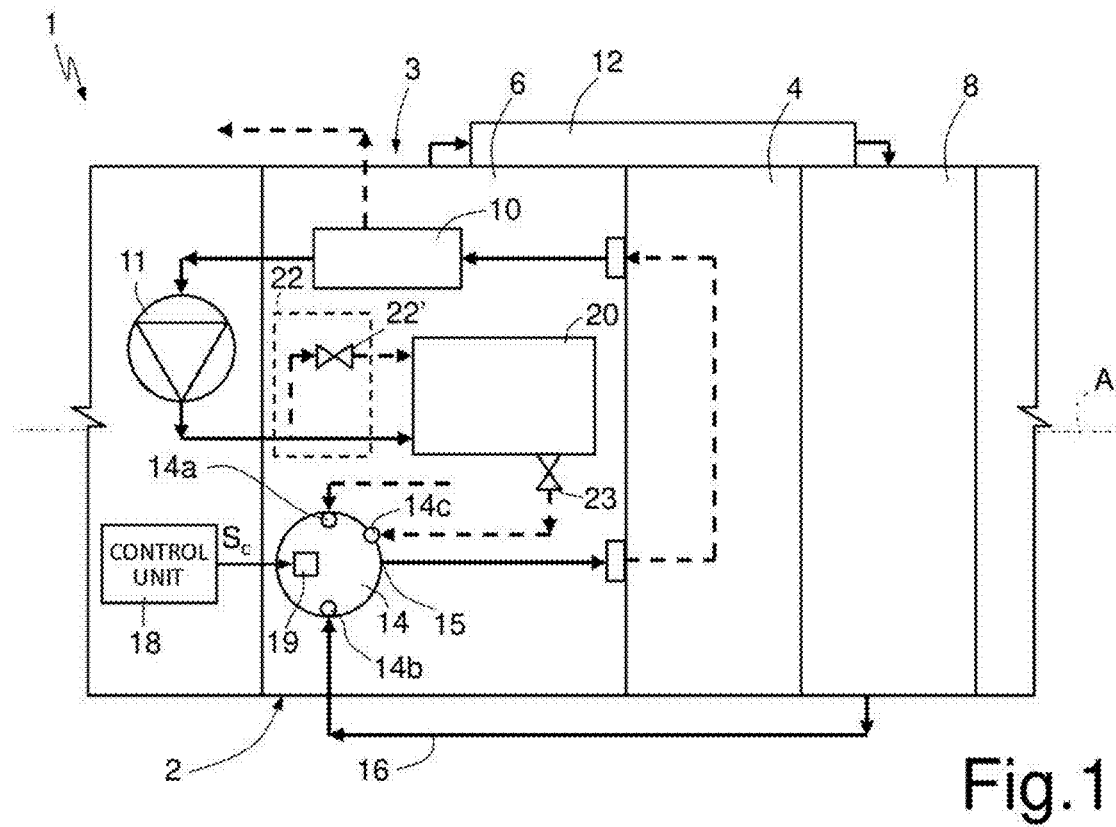
FIG. 1 is a general block diagram of a portion of an underwater vehicle, provided with an electrochemical power supply source according to an embodiment of the present solution.

FIG. 1 shows an underwater vehicle, generally indicated by 1, for example a torpedo, comprising a tubular body, with a longitudinal extension axis A, having a central section inside which a chamber 2 is defined, housing an electrochemical power supply 3 which provides electric power supply to a propulsion engine of the underwater vehicle 1 (not illustrated herein) and/or to on board electronic apparatuses (also not illustrated).

Such electrochemical power supply source 3 comprises an electrochemical stack 4, consisting, in a known way, of a certain number (so-called "stack") of electrochemical cells, designed, in use, to be filled with electrolytic fluid (for example a sodium hydroxide aqueous solution), to cause corresponding chemical reactions for generation of electric power.

In a position adjacent to the electrochemical stack 4, at the aforesaid central section of the underwater vehicle 1, the electrochemical power supply 3 has a first tank 6 (at the front of the electrochemical stack 4 with respect to the longitudinal axis A, also defined as "front tank") and a second tank 8 (at the back of the same electrochemical stack 4 with respect to the longitudinal axis A, defined as "back tank"), designed to respectively contain a high-temperature electrolytic fluid (so-called "hot electrolytic fluid") and a low-temperature electrolytic fluid (so-called "cold electrolytic fluid").

The hot electrolytic fluid, withdrawn from inside the electrochemical stack 4, is introduced into a separator 10, of the fluid-to-liquid-phase type, which has an inlet in fluidic communication with the aforesaid electrochemical stack 4, one first outlet coupled outside the underwater vehicle 1, for ejecting reaction gases, mainly hydrogen ($H_2$), and a second outlet for the outflow of the liquid, separated from the aforesaid reaction gases.

Such liquid is re-introduced into the first tank 6, pressurized by means of a pump 11, for example of the centrifugal type, which has an inlet coupled to the aforesaid second outlet of the separator 10 and a respective outlet coupled inside the first tank 6.

Part of the hot electrolytic fluid contained in the first tank 6 is appropriately directed towards the inlet of a heat exchanger 12, which for example consists of a gap formed inside the central section of the underwater vehicle 1 and having an outer wall directly contacting the seawater outside the underwater vehicle 1. The heat exchanger 12 has an outlet fluidically connected with the inside of the second tank 8, such that the electrolytic fluid, once cooled, reaches the second tank 8.

The pump 11 pressurizes the first tank 6, the second tank 8 and the aforesaid heat exchanger 12, which fluidically connects the first and second tanks 6, 8.

In the embodiment illustrated in FIG. 1, the pump 11 is arranged outside the chamber 2, in an external portion, in a so-called "dry" zone, i.e. not contacting the electrolytic fluid and the seawater.

The electrochemical power supply 3 also comprises a thermostatic valve 14, which allows mixing, at a desired quantity, of a lower-temperature electrolytic fluid with a higher-temperature electrolytic fluid, and introducing the mixed fluid, at a desired and controlled temperature, inside the electrochemical stack 4; in the illustrated embodiment, the thermostatic valve 14 is inside the first tank 6, immersed into the hot electrolytic fluid contained therein.

In particular, the thermostatic valve 14 has: a first mixing inlet 14a fluidically connected to the first tank 6, consisting of an opening in fluidic communication with the first tank 6, by interposition of an appropriate filtering element, such as to receive the hot electrolytic fluid which is generated following the exothermic-type chemical reaction in the electrochemical stack 4 and which is extracted from the same electrochemical stack 4; a second mixing inlet 14b, fluidically connected to the second tank 8 by means of a connecting duct 16, such as to receive the electrolytic fluid appropriately cooled by the heat exchanger 12; and a fluid outlet 15, at which it provides electrolytic fluid mixed at temperature adjusted at a desired value, for introduction into the electrochemical stack 4.

An electronic control module 18, comprising a microcontroller processing unit (or microprocessor, DSP—Digital Signal Processor, or similar digital processing element), is configured so as to provide a control signal Sc to an actuator 19 of the thermostatic valve 14, adapted to appropriately choke the mixing inlets to obtain a desired adjustment of the temperature of the electrolytic fluid mixed at the fluid outlet 15.

In the embodiment illustrated in FIG. 1, the electronic control module 18 is arranged outside the chamber 2, in the "dry" zone, not contacting the electrolytic fluid and seawater.

In a way here not discussed in detail, the control module 18 can be configured so as to implement a closed-loop control of the actuator 19 of the thermostatic valve 14, depending on a reference signal (representing a target value for the outlet temperature and/or a target value of a magnitude associated to such outlet temperature, for example a desired electric power which has to be provided to the electrochemical power supply 3) and on one or more detection signals (provided for example by a temperature sensor, such as a thermocouple, coupled at the fluid outlet 15 to detect the outlet temperature of the electrolytic fluid resulting from the mixing by the thermostatic valve 14, and/or a position sensor coupled to the actuator 19 of the electrostatic valve 14, to detect an actuating position thereof).

The aforesaid reference signal can be for example generated by a main management electronic unit (not illustrated herein) of the underwater vehicle 1, for example based on the desired power which has to be provided by the electrochemical power supply source 3.

According to a particular aspect of the present solution, the electrochemical power supply source 3 further comprises an auxiliary tank 20, designed to contain very hot or "super-hot" electrolytic fluid, i.e. at a very high temperature, higher (typically much higher) than the hot electrolytic fluid in the first tank 6.

Such auxiliary tank 20 is provided with a watertight casing, immersed inside the electrolytic fluid contained in the first tank 6, from which it is kept watertight (note that the auxiliary tank 20 has small size, smaller than the first tank 6). The auxiliary tank 20 contains an electrolytic mixture, for example a mixture of sodium hydroxide powder and sodium oxide, at high concentration, such to cause a highly exothermic reaction when it is dissolved in a liquid and a consequent high rise in temperature (as will be discussed hereinafter).

In particular, the electrochemical power supply source 3 comprises a hydraulic diverter element 22, coupled to the outlet of the pump 11, operable to divert at least part of the liquid delivered from the pump 11 towards the aforesaid auxiliary tank 20.

In one embodiment, such hydraulic diverter element 22 comprises a valve assembly 22', operable to direct all the liquid delivered from the pump 11 towards the first tank 6, in a normal operating condition of the electrochemical power supply source 3; and to divert the delivered liquid partly towards the first tank 6 and partly towards the auxiliary tank 20 in a different operating condition, so called "transition" mode, wherein the underwater vehicle 1 requires generation of a high electric power in a short time.

According to a particular aspect of the present solution, the thermostatic valve 14 is of a three-way type, being provided with a third mixing inlet 14c, fluidically coupled inside the aforesaid auxiliary tank 20, by means of a valve element 23, to receive the very hot electrolytic fluid, during the transition operating condition.

The thermostatic valve 14 is configured so as to switch the two mixing inlets (receiving the higher temperature and lower temperature electrolytic fluids), which are choked to mix the outlet electrolytic fluid and to adjust the temperature, in the transition operating condition with respect to the normal operating condition.

In particular, during the normal operating condition, the thermostatic valve 14 is configured so as to mix the electrolytic fluid received from the first mixing inlet 14a (hot fluid coming from the first tank 6), as a higher-temperature fluid, with the electrolytic fluid received from the second mixing inlet 14b (cold fluid coming from the second tank 8), as a lower-temperature fluid.

During the transition operating condition, the thermostatic valve 14 is instead configured so as to mix the electrolytic fluid received from the first mixing inlet 14a (hot fluid coming from the first tank 6), this time as a lower-temperature fluid, with the electrolytic fluid received from the third mixing inlet 14c (very hot fluid coming from the auxiliary tank 20), as a higher-temperature fluid, thereby allowing direct introduction into the electrochemical stack 4 of high-temperature electrolytic fluid (resulting from the aforesaid mixture of hot and very-hot fluids).

The operation of the electrochemical power supply source 3 according to the present invention will now be described in greater detail.

Figure 2A:
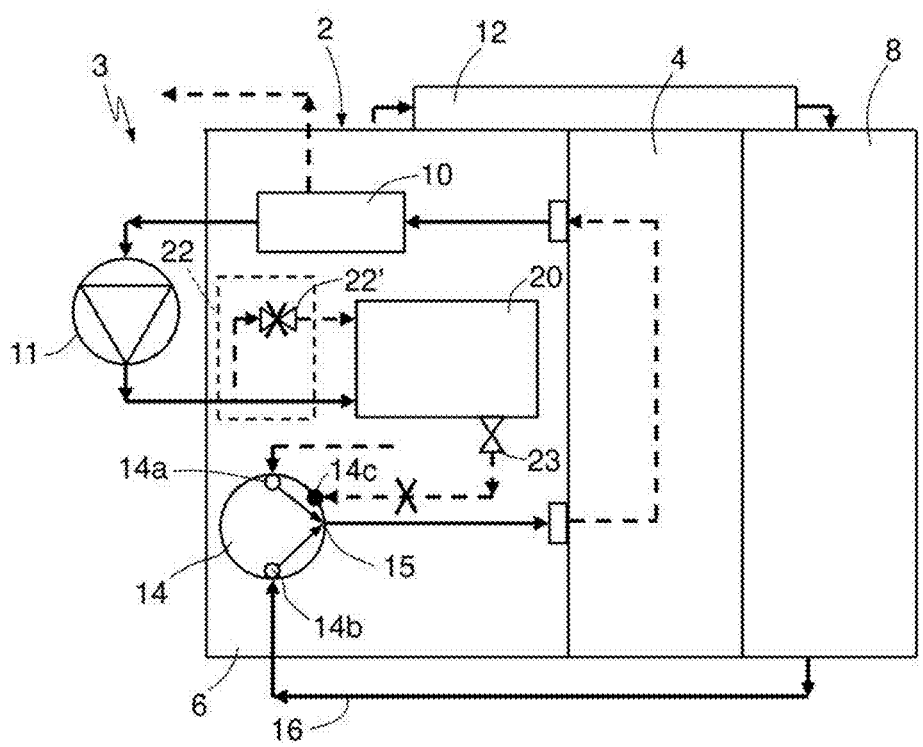
FIG. 2A schematically shows a first operative configuration of the electrochemical power supply source of FIG. 1.

In a normal operating condition, schematically illustrated in FIG. 2A, the three-way thermostatic valve 14 is controlled for traditional operation, i.e. mixing the electrolytic fluid contained in the first tank 6 (to which it is connected with the "hot" inlet way, i.e. at a higher temperature, coupled in this case to the first mixing inlet 14a) and the electrolytic fluid contained in the second tank 8 (to which it is connected with the "cold" inlet way, i.e. at a lower temperature, coupled in this case to the second mixing inlet 14b); the third mixing inlet 14c is in this case closed. Unlike traditional solutions, the control module 18 can control the thermostatic valve 14 so as to adjust the electrolytic fluid temperature to be injected into the electrochemical stack 4 at a value (for example in the range 40-60° C.) lower than the usual one for low-power in the current applications, with a consequent efficiency increase (leakage currents inside the electrochemical stack 4 are reduced).

The auxiliary tank 20 in this operating condition is kept sealed from the first tank 6 wherein it is immersed; in particular, the valve element 23 is closed and the hydraulic diverter element 22 blocks the liquid input from the pump 11 towards the aforesaid auxiliary tank 20 (all the liquid from the pump 11 is directed towards the first tank 6).

Figure 2B:
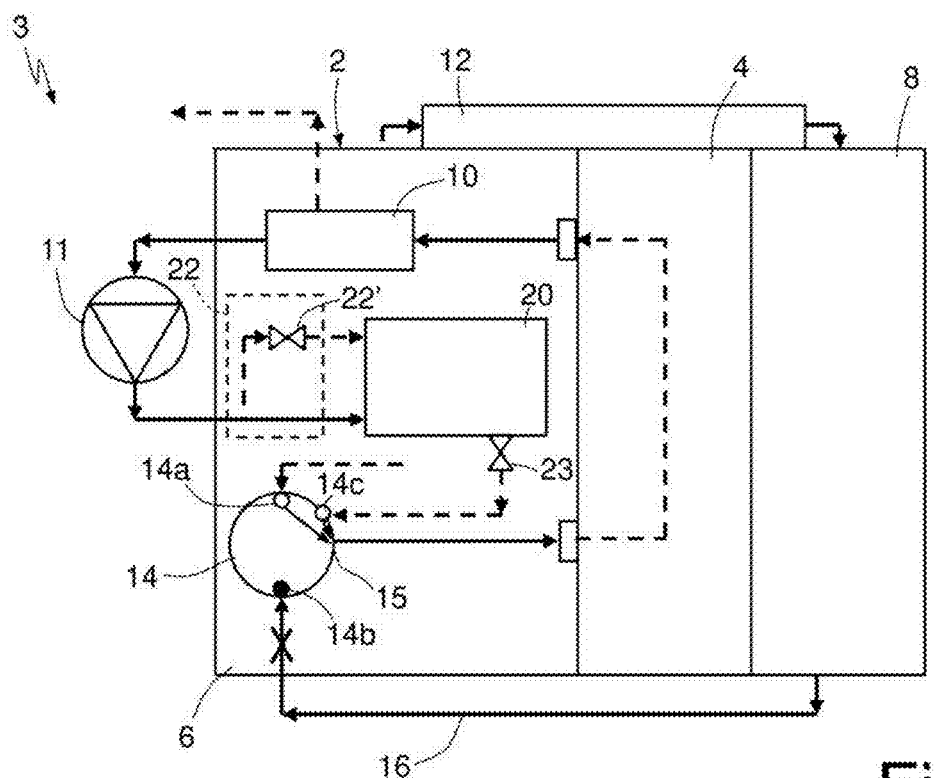
FIG. 2B schematically shows a second operative configuration of the electrochemical power supply source of FIG. 1.

As schematically shown in FIG. 2B, in a transition operating condition, i.e. when a high power supply is required by the electrochemical power supply source 3, it is required to inject electrolytic fluid into the electrochemical stack 4 in a short time (few tens of seconds) at temperatures higher than the values (for example 40-60° C.) employed in the normal low-power operating condition, otherwise a voltage drop up to the switching off of the system occurs (temperature values considered as suitable are in the range 70-95°).

For this purpose, the present solution thus provides activating the auxiliary tank 20, using the hydraulic diverter element 22 which enables switching the liquid delivered from the pump 11 to the same auxiliary tank 20; the liquid thus dissolves the powder mixture (for example of sodium hydroxide and sodium oxide) contained therein. The dissolution reaction is highly exothermic and the new mixture thus formed in the auxiliary tank 20 reaches very high temperatures, for example around 150° C. (the "super-hot" electrolytic fluid is thus obtained).

When the internal pressure of the auxiliary tank 20 exceeds the outer one of the first tank 6, the valve element 23, upon electric control or automatically, opens the connection between the auxiliary tank 20 and the thermostatic valve 14.

In particular, such thermostatic valve 14 has in the meantime switched its inlets into the transition mode, in order to allow mixing the "hot" electrolytic fluid contained in the first tank 6 (to which it is connected with the "cold" inlet way, at lower temperature, coupled in this case to the first mixing inlet 14a) and the "super-hot" electrolytic fluid contained in the auxiliary tank 20 (to which it is connected with the "hot" inlet way, at higher temperature, coupled in this case to the third mixing inlet 14c); the second mixing inlet 14b (coupled to the second tank 8) is in this case closed.

Therefore, the thermostatic valve 14 is controlled so as to mix two fluids, a "super-hot" one with temperatures (at the beginning of the transition) for example of about 150° C. and a "hot" one with initial transition temperatures for example within the range 40-60° C. Appropriately mixing these two electrolytic fluids, the temperature of the mixed fluid at the fluid outlet 15 of the thermostatic valve 14 is in the example within the range 70-95° C.; such mixed fluid enters directly and substantially immediately into the electrochemical stack 4.

The electrochemical stack 4 can therefore start immediately to deliver maximum power, thereby producing a great quantity of thermal energy which heats the electrolytic fluid passing therethrough; such electrolytic fluid heated by the electrochemical stack 4 is recycled through the pump 11 and in particular it is re-introduced both in the first tank 6 and in the auxiliary tank 20.

As the transition step proceeds, the electrolytic fluid in the auxiliary tank 20 progressively reduces its temperature ("super-hot" fluid gets out and "hot" fluid enters), while the electrolytic fluid in the first tank 6 gradually increases its temperature ("cold" fluid gets out and "hot" fluid enters).

The transitory phase thus determined allows a quick switching of the electrochemical stack 4 towards high-power, "amplifying" and "accelerating" heating of the electrolytic fluid initially activated by the auxiliary tank 20.

The transitory phase terminates when the temperature levels of the electrolytic fluid in the first tank 6 typical of the high-power are reached; the inlet ways of the thermostatic valve 14 can thus be switched once more to return to the normal operating condition (for mixing electrolytic fluids from the first tank 6 and from the second tank 8), in the same way as previously described for the low-power condition (but with a high adjustment temperature output from the thermostatic valve 14).

In detail, the thermostatic valve 14 is controlled once more so that the first mixing inlet 14a is coupled to the first tank 6 (constituting once more the "hot" inlet way), and the second mixing inlet 14b is connected to the second tank 8 (constituting the "cold" inlet way); the third mixing inlet 14c is once more closed.

The control module 18 thereby controls the thermostatic valve 14 so as to adjust the temperature of the electrolytic fluid to be injected in the electrochemical stack 4 at the desired value for high-power (for example in the range 70-95° C.).

The auxiliary tank 20 in this operating condition is kept at pressure balance with respect to the first tank 6 in which it is immersed, with the valve element 23 that is closed and the hydraulic diverter element 22 that is open.

It is therefore noted that the normal operating condition can both correspond to the "low-power" condition prior to the transition mode, and to the "high-power" condition after the transition mode, with the only difference that at low-power, the auxiliary tank 20 is sealed, while in the final high-power step it is flooded and at pressure balance with the first tank 6.

Figure 3A:
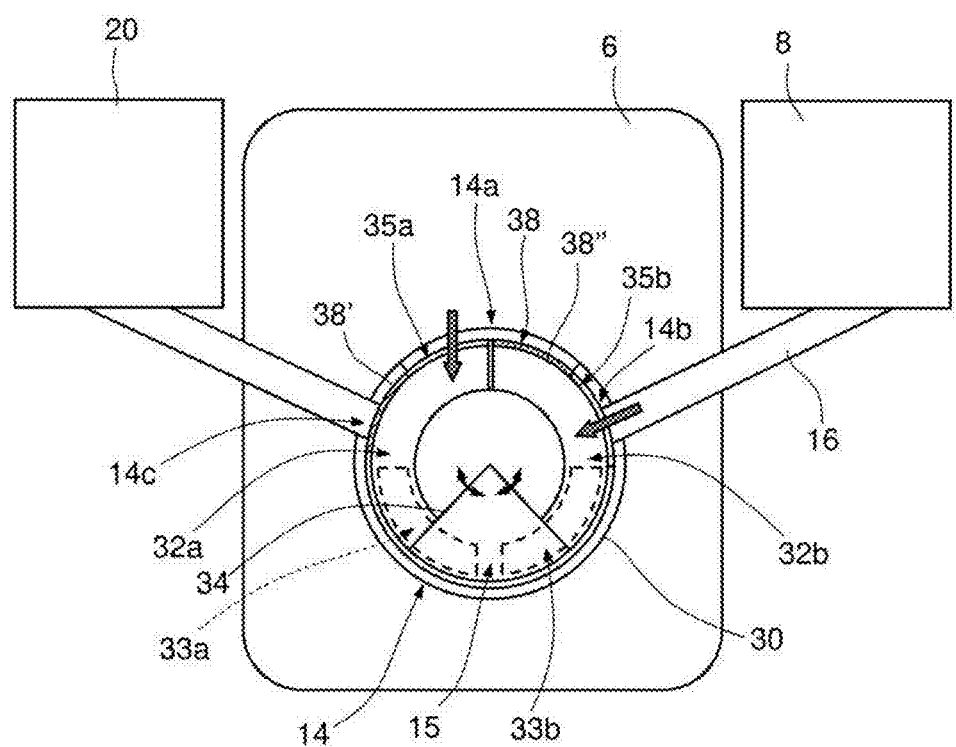
FIG. 3A is a schematic representation of a thermostatic valve of the electrochemical power supply source of FIG. 1, in the first operative configuration.
Figure 3B:
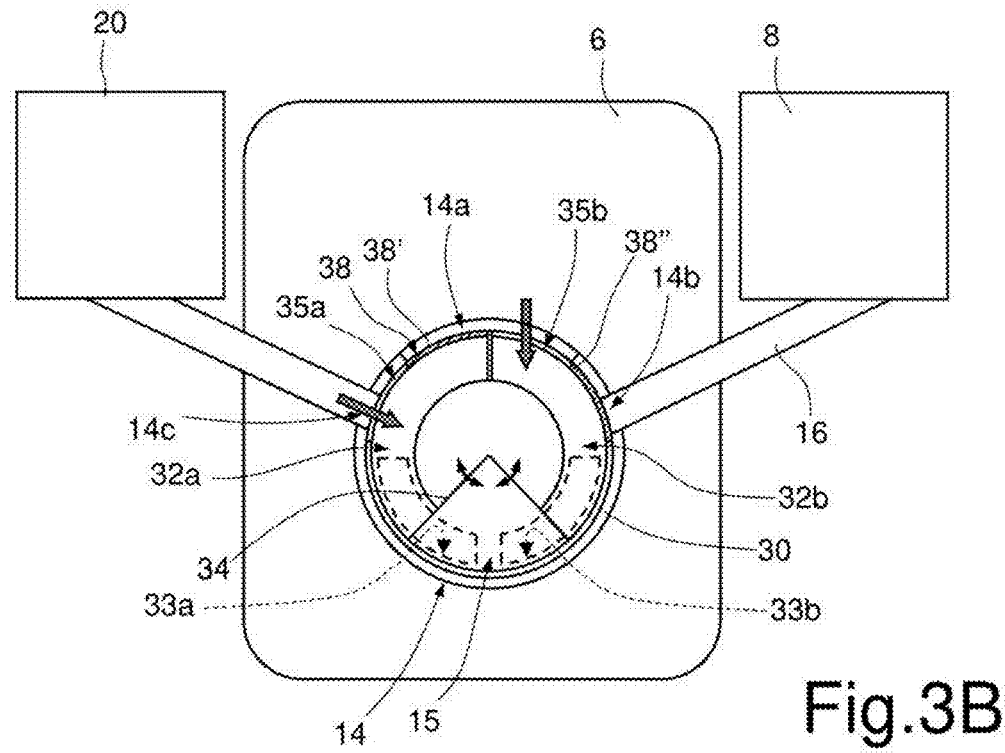
FIG. 3B is a schematic representation of the thermostatic valve of the electrochemical power supply source of FIG. 1, in the second operative configuration.

With reference to FIGS. 3A and 3B it is now schematically described a possible implementation of the three-way thermostatic valve 14, configured to implement the previously described solution.

In this embodiment, the thermostatic valve 14 comprises a valve body 30 wherein a first chamber 32a, intended to receive "hot" electrolytic fluid, i.e. at a higher temperature, and a second chamber 32b, intended to receive "cold" electrolytic fluid, i.e. at a lower temperature are defined.

The first and the second chambers 32a, 32b are separated from each other and are not in fluidic communication; in the example shown, the valve body 30 has a substantially cylinder conformation and the first and second chamber 32a, 32b are defined in a first and in a second half of such valve body 30, separated by a septum.

The first and the second chamber 32a, 32b have a respective outlet opening 33a, 33b, having, in the illustrated example, in section, a portion-of-arc conformation; such outlet openings 33a, 33b lead into the fluid outlet 15 of the thermostatic valve 14 and are choked by a moving shutter 34, controllable in rotation in order to vary the "outlet port" (i.e. the orifice in fluidic communication with the fluid outlet 15) of the aforesaid outlet openings 33a, 33b and, consequently, the quantity of "hot" electrolytic fluid and "cold" electrolytic fluid that are mixed. The moving shutter 34 represents in this embodiment the actuator 19 (or part of such actuator 19) controllable by the electronic control module 18 to adjust the outlet fluid temperature.

In detail, in the illustrated embodiment, the first chamber 32a has an inlet opening 35a that can be selectively and alternatively fluidically connected to the first mixing inlet 14a of the thermostatic valve 14 and to the first tank 6 (in the normal operating condition, shown in FIG. 3A), or to the third mixing inlet 14c of the thermostatic valve 14 and to the auxiliary tank 20 (in the transition operating condition, shown in FIG. 3B).

The second chamber 32b has, in turn, an inlet opening 35b that can be selectively and alternatively fluidically connected to the first mixing inlet 14a of the thermostatic valve 14 and to the first tank 6 (in the transition operating condition, shown in FIG. 3B) or to the second mixing inlet 14b of the thermostatic valve 14 and to the second tank 8 (in the normal operating condition, shown in FIG. 3A).

The thermostatic valve 14 has to this end a moving selector 38, having in the example an arc-shaped conformation at an outer portion of the body 30 of the same thermostatic valve 14, defining a first and a second arc-shaped portion 38', 38", integral between each other, which is movable rotating between a first position and a second position (for example, upon control of the electronic control module 18, by the control signal Se).

In the first position, corresponding to the normal operating condition (FIG. 3A), the first arc-shaped portion 38' closes the inlet to the first chamber 32a from the auxiliary tank 20 (blocking communication between the inlet opening 35a and the third mixing inlet 14c) and at the same time opens the inlet to the first chamber 32a from the first tank 6 (opening communication between the inlet opening 35a and the first mixing inlet 14a); and furthermore, jointly, the second arc-shaped portion 38" closes the inlet to the second chamber 32b from the first tank 6 (blocking communication between the inlet opening 35b and the first mixing inlet 14a)

and at the same time opens the inlet to the second chamber 32b from the second tank 8 (opening communication between the inlet opening 35b and the second mixing inlet 14b).

In the second position, corresponding to the transition operating condition (FIG. 3B), the first arc-shaped portion 38' rotates to open the inlet to the first chamber 32a from the auxiliary tank 20 (opening communication between the inlet opening 35a and the third mixing inlet 14c) and at a same time closing the inlet to the first chamber 32a from the first tank 6 (blocking communication between the inlet opening 35a and the first mixing inlet 14a); and, furthermore, the second arc-shaped portion 38" rotates (integrally with the aforesaid first arc-shaped portion 38') to open the inlet to the second chamber 32b from the first tank 6 (enabling communication between the inlet opening 35b and the first mixing inlet 14a) and at the same time closes the inlet to the second chamber 32b from the second tank 8 (blocking communication between the inlet opening 35b and the second mixing inlet 14b).

It is therefore noted that the first mixing inlet 14a of the thermostatic valve 14 is shared by both chambers 32a, 32b, alternatively and depending on the operating mode; the second mixing inlet 14b is coupled only to the second chamber 32b; and the third mixing inlet 14c is coupled only to the first chamber 32a. The moving selector 38 is configured so as to open, in each of the operating conditions, only two inlets, one towards the first chamber 32a and the other towards the second chamber 32b.

The advantages of the present solution are clear from the previous description.

It is in any case underlined that the described solution improves efficiency of the electrochemical power supply source 3, increasing duration thereof and consequently the operating distance of the relative underwater vehicle 1 (for example the launching distance in case of missions wherein the low-speed phase is the most important part, i.e. high-distance launches); in a corresponding manner, the distance being equal, the present solution allows to save energy to be spent at the final phase of the mission (target attack, in case of a torpedo), to be generally performed at high speed.

Figure 4:
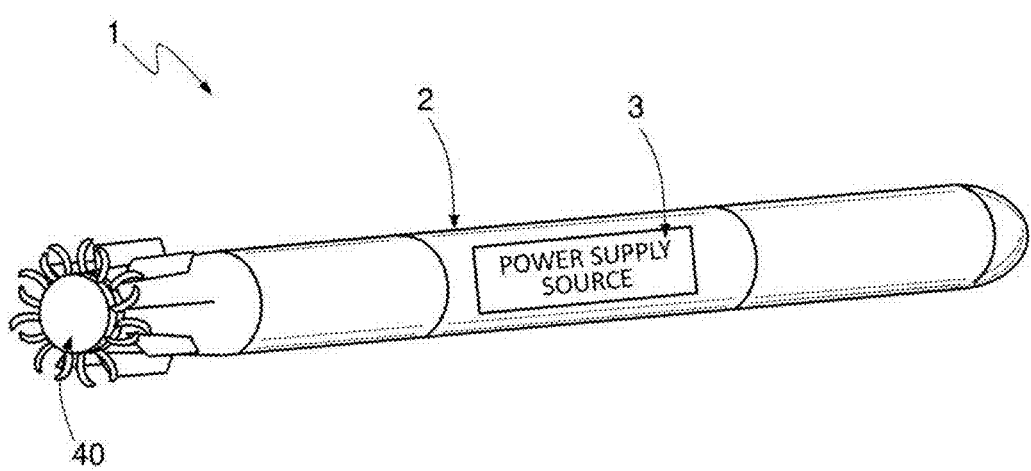
FIG. 4 is a schematic view of an underwater vehicle, in particular a torpedo, having a propulsion system supplied by the electrochemical power supply.

As discussed, and as schematically illustrated in FIG. 4, the present solution can be advantageously employed in an underwater vehicle 1, in the example a torpedo, having a propulsion system 40 supplied by the electrochemical power supply source 3, which is housed in chamber 2 of the central section of the torpedo tubular body.

In particular, it is noted that torpedoes are generally designed to be able to perform rapid accelerations, reaching high speeds, while they are not optimized for low speeds (which are in any case associated to high-power consumption).

The proposed solution allows, by contrast, to provide the torpedo with two "gears" (an "eco-drive gear" and a "sport-drive gear"), both of them optimized. The torpedo in fact starts in "eco-drive gear" and keeps that until the mission requires it; thanks to the possibility of reducing the temperature in normal operating condition, the torpedo proceeds at a low speed with a limited energy consumption. When the attack step is required, the torpedo can switch to the "sport-drive gear" (in a few seconds), reaching high speeds (thus having a higher residual energy of the corresponding power supply source). It is noted that the longer the time spent in the eco-drive gear, the greater the gain in terms of remaining energy acquired in the final part of the mission in sport-drive gear if compared to traditional torpedoes (it is clear that such "gear change" can be carried out only once during the mission).

It is clear that changes and variations can be made to what herein described and illustrated without departing from the scope of the present invention, as defined in the appended claims.

In particular, it is underlined that the embodiment of the electrostatic valve 14 described with reference to FIGS. 3A and 3B is to be intended for exemplary and non-limiting purposes, as different technical solutions that are functionally equivalent may be identified.

Finally, it must be noted once more that the present solution is advantageously applicable to increase the efficiency of an electrochemical power supply source 3 to be used in a marine environment, inside a generic underwater vehicle 1, which can also differ from the torpedo previously specifically referred to, as for instance it can advantageously be used inside a so-called Underwater Autonomous Vehicle (UAV).

The invention claimed is:

1. An electrochemical-type power supply (3), for use in marine environment, comprising:
    an electrochemical stack (4), configured to generate electric power, in the presence, internally, of an electrolytic fluid,
    a first tank (6), configured to contain electrolytic fluid at a first temperature;
    a second tank (8), configured to contain electrolytic fluid at a second temperature, lower than the first temperature,
    a thermostatic valve (14), configured to mix electrolytic fluid at a lower temperature with electrolytic fluid at a higher temperature, for generating a mixed electrolytic fluid to be introduced into the electrochemical stack (4) at a controlled temperature for generating a desired electric power,
    said electrochemical power supply source (3) further comprising an auxiliary tank (20), configured to contain electrolytic fluid at a third temperature, higher than said first temperature; wherein said thermostatic valve (14) is configured to be connected to the auxiliary tank (20) and to receive, at an input, the electrolytic fluid at said third temperature, as said electrolytic fluid at a higher temperature, for generating the mixed electrolytic fluid, in a given operating condition.

2. The power supply source according to claim 1, wherein said thermostatic valve (14) has: a fluid outlet (15) connected to said electrochemical stack (4) and configured to provide said mixed electrolytic fluid; a first mixing inlet (14a) fluidically connected to said first tank (6), to receive the electrolytic fluid at said first temperature; a second mixing inlet (14b) fluidically connected to said second tank (8), to receive the electrolytic fluid at said second temperature; and a third mixing inlet (14c), configured to be fluidically coupled to said auxiliary tank (20), to receive the electrolytic fluid at said third temperature; wherein said thermostatic valve (14) is configured to switch the mixing inlets (14a-14c) between:
    a normal operating condition, wherein said thermostatic valve (14) is configured to mix the electrolytic fluid at said first temperature received from the first mixing inlet (14a), as said fluid at a higher temperature, with the electrolytic fluid at said second temperature received from the second mixing inlet (14b), as said fluid at a lower temperature;

a transition operating condition, corresponding to said given operating condition, wherein said thermostatic valve (14) is configured to mix the electrolytic fluid at said first temperature received from the first mixing inlet (14a), as said fluid at a lower temperature, with the electrolytic fluid at said third temperature received from the third mixing inlet (14c), as said fluid at a higher temperature.

3. The power supply source according to claim 2, wherein said transition operating condition is a high-power generation condition by said power supply source (3), in which said thermostatic valve (14) is configured to directly introduce, in said electrochemical stack (4), mixed electrolytic fluid at a high temperature, as a result of the mixing between the fluids at said first and third temperatures.

4. The power supply source according to claim 3, wherein said normal operating condition for said thermostatic valve (14) corresponds to: a low-power generation condition by said power supply source (3), prior to said transition operating condition; and a high-power generation condition by said power supply source (3), after said transition operating condition is terminated.

5. The power supply source according to claim 2, further comprising an electronic control module (18), operatively coupled to said thermostatic valve (14) and configured to provide a control signal (Se) to switch and, appropriately choke, said mixing inlets (14a-14c) and obtain a desired regulation of the temperature of the mixed electrolytic fluid at said fluid outlet (15).

6. The power supply source according to claim 2, wherein said thermostatic valve (14) comprises: a valve body (30) in which a first chamber (32a) is defined, designed to receive said electrolytic fluid at a higher temperature, and a second chamber (32b) is defined, designed to receive said electrolytic fluid at a lower temperature, said first and second chambers (32a, 32b) having a respective outlet opening (33a, 33b) leading into said fluid outlet (15); and an adjustment actuator element (34), operable to vary the orifices of said outlet openings (33a, 33b) and, therefore, the quantities of electrolytic fluid at a higher temperature and of electrolytic fluid at a lower temperature being mixed to generate said mixed electrolytic fluid at said fluid outlet (15).

7. The power supply source according to claim 6, wherein said first chamber (32a) has an inlet opening (35a) selectively and alternatively fluidically connectable to the first mixing inlet (14a) and to said first tank (6) in said normal operating condition, or to the third mixing inlet (14c) and to said auxiliary tank (20) in said transition operating condition; and wherein said second chamber (32b) has a respective inlet opening (35b) selectively and alternatively fluidically connectable to the first mixing inlet (14a) and to said first tank (6) in said transition operating condition, or to the second mixing inlet (14b) and to said second tank (8) in said normal operating condition.

8. The power supply source according to claim 7, wherein said thermostatic valve (14) further comprises a moving selector (38), defining a first and a second portion (38', 38"), integral with each other, movable in rotation between a first position and a second position; wherein, in said first position, corresponding to said normal operating condition, the first portion (38') closes the inlet to the first chamber (32a) from said auxiliary tank (20) and at a same time opens the inlet to said first chamber (32a) from said first tank (6), and furthermore, jointly, said second portion (38") closes the inlet to the second chamber (32b) from said first tank (6) and, at a same time, opens the inlet to said second chamber (32b) from said second tank (8); and in said second position, corresponding to the transition operating condition, said first portion (38') opens the inlet to the first chamber (32a) from said auxiliary tank (20) and, at a same time, closes the inlet to said first chamber (32a) from said first tank (6) and, furthermore, said second portion (38") opens the inlet to the second chamber (32b) from said first tank (6) and, at a same time, closes the inlet to said second chamber (32b) from said second tank (8).

9. The power supply source according to claim 2, wherein said thermostatic valve (14) is housed inside said first tank (6); said first mixing inlet (14a) is constituted by an opening in direct fluidic communication with said first tank (6); and said second inlet (14b) is connected to said second tank (8) through a connecting duct (16); further comprising a heat exchanger (12) which fluidically connects said first tank (6) and said second tank (8), cooling electrolytic fluid drawn from said first tank (6) which is introduced into said second tank (8).

10. The power supply source according to claim 2, further comprising: a fluid-gas separator (10), having an inlet which receives electrolytic fluid drawn from the inside of said electrochemical stack (4), and an outlet for the outflow of liquid separated from reaction gas; and a pump (11) coupled to said separator (10) and configured to reintroduce the liquid into said first tank (6); further comprising a hydraulic diverter element (22), coupled to said pump (11) and operable to: direct all the liquid from the pump (11) to said first tank (6), in said normal operating condition, and; divert the liquid from the pump (11) partly towards said auxiliary tank (20) in said transition operating condition.

11. The power supply source according to claim 2, further comprising a valve element (23), interposed between said third mixing inlet (14c) and the inside of said auxiliary tank (20), which can be configured in an open configuration during said transition operating condition and in a closed configuration during the normal operating condition.

12. The power supply source according to claim 1, wherein said auxiliary tank (20) is housed inside said first tank (6) and has smaller dimensions than said first tank (6); said auxiliary tank (20) having a own watertight casing, immersed inside the electrolytic fluid contained in said first tank (6), and containing a high-concentration electrolytic mixture, designed to generate said electrolytic fluid at the third temperature when flown with a liquid.

13. An underwater vehicle (1), comprising the electrochemical power supply source (3) according to claim 1.

14. The vehicle according to claim 13, comprising a tubular body, having an axis of longitudinal extension (A), including a central section inside which a chamber (2) is defined, housing said electrochemical power supply source (3).

15. The vehicle according to claim 13, being a torpedo and having a propulsion system (40); wherein said electrochemical power supply source (3) is configured to supply electrical power to said propulsion system (40).

* * * * *